United States Patent [19]
Jackson et al.

[11] Patent Number: 5,335,113
[45] Date of Patent: Aug. 2, 1994

[54] DIFFRACTION GRATING

[75] Inventors: Wayne K. Jackson; Richard A. Goodman, both of Victoria, Australia

[73] Assignee: Reserve Bank of Australia, Sydney, Australia

[21] Appl. No.: 743,387

[22] PCT Filed: Dec. 19, 1989

[86] PCT No.: PCT/AU89/00542
   § 371 Date: Aug. 19, 1991
   § 102(e) Date: Aug. 19, 1991

[87] PCT Pub. No.: WO90/07133
   PCT Pub. Date: Jun. 28, 1990

[30] Foreign Application Priority Data
   Dec. 19, 1988 [AU] Australia .................. PJ2020

[51] Int. Cl.$^5$ ............... G02B 5/18; G09F 3/00; B42D 15/00
[52] U.S. Cl. ................... 359/569; 359/572; 283/72; 283/91
[58] Field of Search ............ 359/569, 570, 574, 568, 359/572; 283/75, 72, 86, 91

[56] References Cited

U.S. PATENT DOCUMENTS

| | | | |
|---|---|---|---|
| 4,130,348 | 12/1978 | Minami | 359/563 |
| 4,520,387 | 5/1985 | Cortellini | 359/34 |
| 4,984,824 | 1/1991 | Antes et al. | 283/91 |
| 5,032,003 | 7/1991 | Antes | 283/91 |
| 5,145,212 | 9/1992 | Mallik | 283/72 |

OTHER PUBLICATIONS

R. A. Lee "Generalized Curvilinear Diffraction Gratings I–V" *Optica Acta* vol. 30, #s 3 and 4, 1983.
R. A. Lee et al, "Diffraction Patterns of Generalized Curvilinear Diffraction Gratings, etc." *Optica Acta*, vol. 32, #5, 1985.
Lee, R. A., 1983, vol. 30, No. 4, 449–464 Generalized Curvilinear Diffraction Gratings.

*Primary Examiner*—Loha Ben
*Assistant Examiner*—Darryl Collins
*Attorney, Agent, or Firm*—Foley & Lardner

[57] ABSTRACT

A diffraction grating of reflective or transmissive lines is formed by a regular matrix of pixels each containing a respective curvilinear portion of one or more of said lines. When the pixels are illuminated, each generates a two-dimensional optical catastrophe image diffraction pattern whereby the total image diffraction pattern of the grating is optically variable but structurally stable. The invention further provides a diffraction grating of reflective or transmissive lines, comprising a multiplicity of diffraction grating regions which are at least partly separated by multiplicity of grating free regions. Each grating free region has a dimension which is at least large enough to be resolved by the human eye, the total grating free areas not exceeding about 20 to 50% of the total area of the grating. The disclosed diffraction grating is useful as a security device for currency or credit cards.

42 Claims, 9 Drawing Sheets

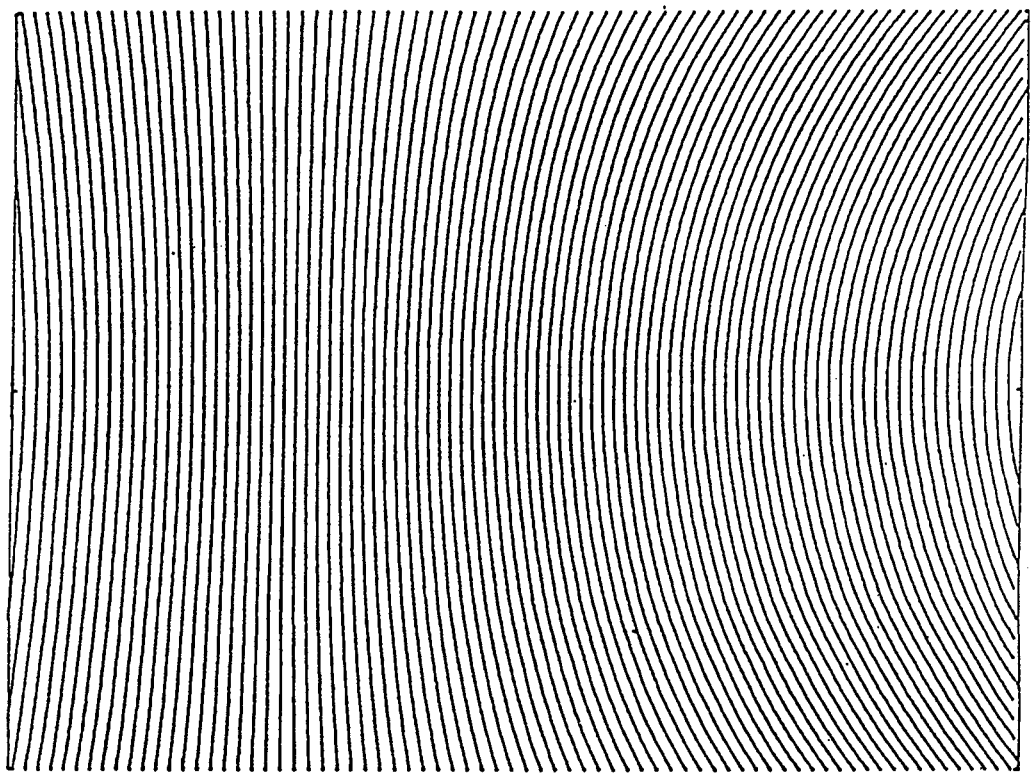
Y-AXIS  *FIG. 2*
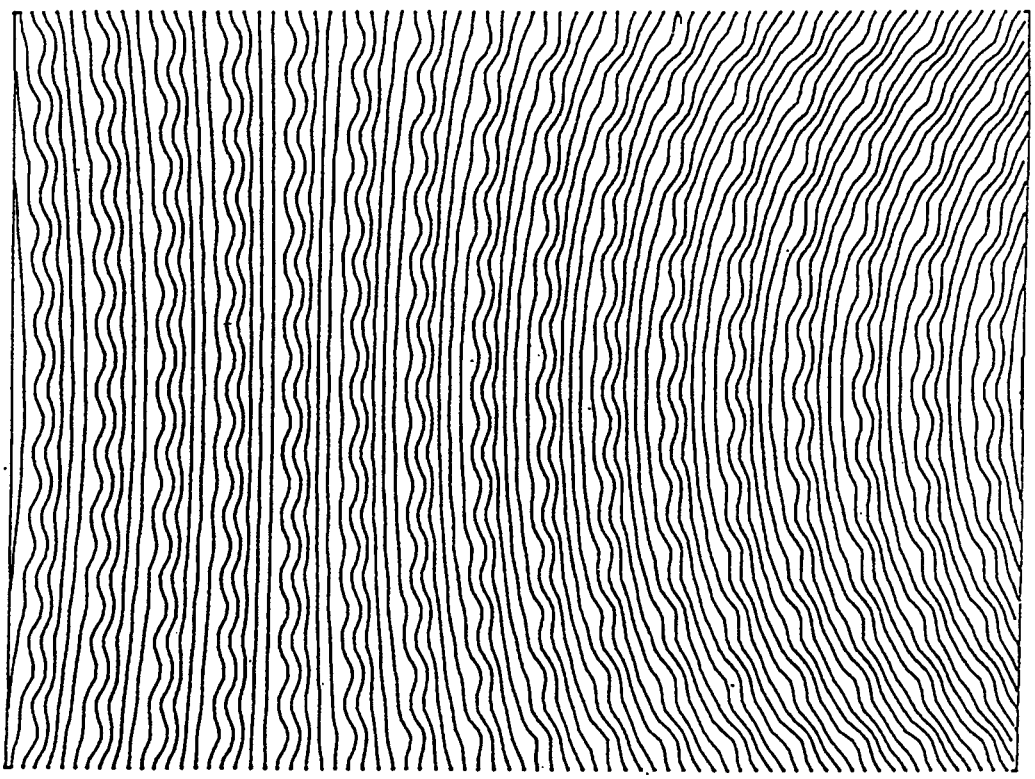
Y-AXIS  *FIG. 3*

DIFFRACTION GRATING

This invention relates to diffraction gratings and is especially but not exclusively concerned with diffraction gratings which may be employed as security devices, for example, in currency notes and credit cards.

The traditional security device employed to assist in distinguishing genuine bank notes from counterfeits is a metal foil insert. This device is not a great challenge to professional counterfeiters and it has been considered desirable for some time to develop satisfactory security inserts which are more sophisticated and less easily reproduced than metal foil strips. Past proposals, some of which have been made with particular regard to the recent development of longer life currency notes comprising of plastic laminates, have included diffraction structures such as multiple film devices, straight line gratings, image holograms, and line gratings with precisely determined variable depth grooves. None of these proposals have reached fruition however, because the optically variable patterns produced could not sustain an acceptable level of structural stability as the notes became heavily crinkled in day-to-day use. It is one objective of this invention to overcome this problem in a device of adequate complexity for use as a currency note security insert.

In one aspect, the invention essentially comprises a significant practical use of the application of the present inventor's theory of generalized curvilinear diffraction gratings to optical diffraction catastrophes. The theory is outlined in Optica Acta 1983, Vol. 30 Nos. 3 and 4, and the application to optical diffraction catastrophes is disclosed in Vol. 30, No. 4, 449–464 and in Vol. 32, No. 5, 573–593. In particular, it has been realized that the aforementioned objective can be achieved by imposing a matrix of diffraction catastrophe pixels on a regular diffraction grating.

The invention accordingly provides a generalized diffraction grating of reflective or transmissive lines formed by a regular matrix of pixels each containing a respective curvilinear portion of one or more of said lines, which pixels when illuminated each generate a two-dimensional optical catastrophe image diffraction pattern whereby the total image diffraction pattern of the grating is optically variable but structurally stable.

By "image diffraction pattern" in the context of this specification is meant the optical image observed by the naked eye focused on the grating when it is illuminated by an arbitrarily extended diffuse source of finite width such as a fluorescent tube. A pattern is described herein as "optically variable" where it varies, according to the position of observation and is "structurally stable" if its broad form at any given position of observation is not materially altered by distortion of the grating surface.

Expressed in mathematical terms, the reflective/transmissive lines of the grating are advantageously such that they are defined, in terms of coordinates x,y in the plane of the grating, by the equation $S(x,y) = kN$ where k is a scaling factor, N is an integer and the function $S(x,y)$ is given by:

$$S(x,y) = W(x,y) + P(x,y) + C(x,y) \quad (1)$$

where $S(x,y)$ is the initial phase function generated by the grating when illuminated normally by a collimated monochromatic light wave, $W(x,y)$ is a carrier wave of non-zero order, $P(x,y)$ is a picture or portrait function which determines the broad shape of the image diffraction pattern, and is piecewise relatively slowly varying with respect to x and y, and $C(x,y)$ is a periodic lattice function of x, y which varies relatively rapidly with respect to x and y and whose Hessian is not identically zero except along certain characteristic lines corresponding to the caustics in the Fresnel or Fraunhofer diffraction pattern of the grating.

The Hessian of $C(x,y)$ is a standard complex derivative expressed as follows:

$$[\partial^2 C(x,y)/\partial x^2].[\partial^2 C(x,y)/\partial y^2] - [\partial^2 C(x,y)/\partial x \partial y]^2 \quad (2)$$

The condition that the Hessian be not identically zero except along certain characteristic lines is a condition for an optical catastrophe image diffraction pattern in accordance with the above theory of generalized curvilinear diffraction patterns. The function $C(x,y)$ may thus be described as the catastrophe function for the grating.

The right side of equation (1) may include a further summed term $F(x,y)$, being a focussing term of the form $F(x,y) = b_1 x^2 + b_2 y^2$ where $b_1$ and $b_2$ are constants chosen to focus the diffracted waves at the required distance from the grating.

The pixels are preferably less than 1 mm$^2$ in area, most preferably between 0.25 and 0.75mm$^2$ in area. The reflective/transmissive lines are advantageously reflective grooves, e.g. square or sinusoidal cut grooves or a combination of square and sinusoidal cut grooves, in a metallized surface.

The invention further provides a diffraction grating of reflective or transmissive lines, comprising a multiplicity of diffraction grating regions, which are at least partly separated by a multiplicity of grating free regions, each grating free region having a dimension which is at least large enough to be resolved by the human eye, the total grating free areas not exceeding about 20 to 50% of the total area of the grating.

The presently preferred optimum grating free area is about 30%, but it will be appreciated that this figure is somewhat arbitrary.

Each diffraction grating region may comprise any suitable diffraction grating structure, including any one of the types of optical diffraction catastrophies described in greater detail in the papers detailed above.

The grating regions may be arranged at various angles to produce desired optical effects. Each grating region should be no smaller than the resolution of the human eye and the maximum size of each grating free region should be no greater than about 20 to 50% of the total grating area and optimally about 30% of the total area.

By providing a multiplicity of grating free areas, the image produced has improved contrast thereby resulting in a perceivable brighter diffraction pattern.

The invention will be further described, by way of example only, with reference to the accompanying drawings, in which:

FIGS. 1A, 1B and 1C compare the image pattern of a screen printed portrait, a conventional line grating portrait, and a grating in accordance with the invention;

FIG. 2 is a diagrammatic representation of a conventional line diffraction grating;

FIG. 3 is a diagrammatic representation of the grating of FIG. 2 modified so as to be a diffraction grating in accordance with the invention;

Figure 8:
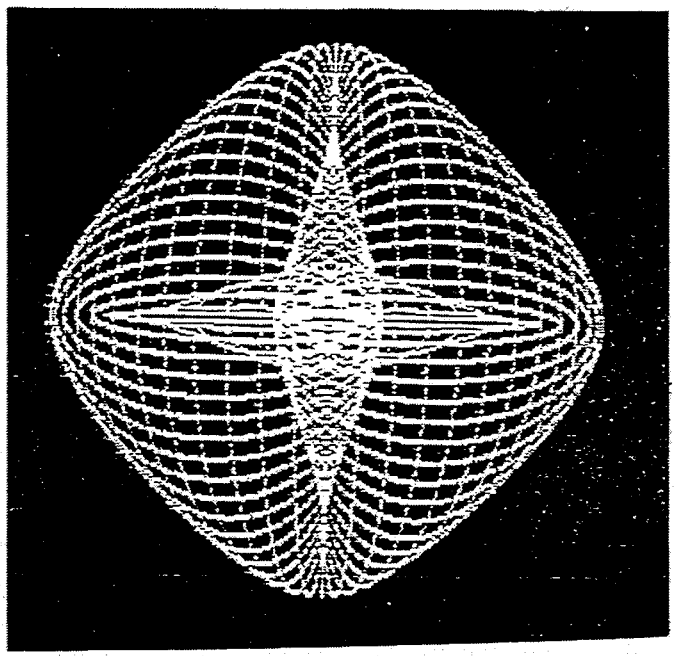
Figure 9:
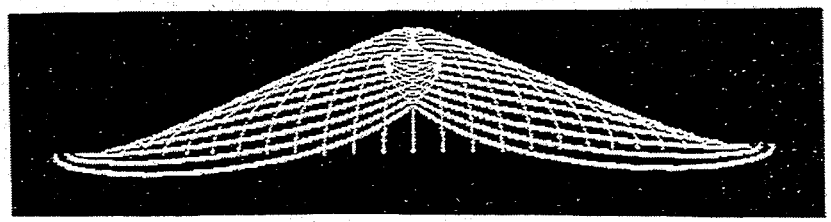
Figure 10:
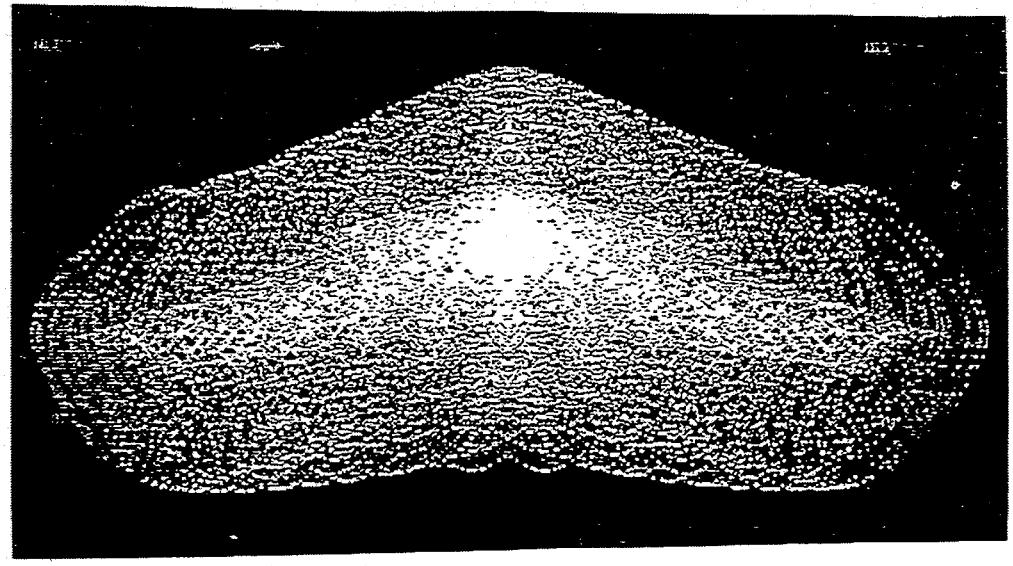
Figure 11:
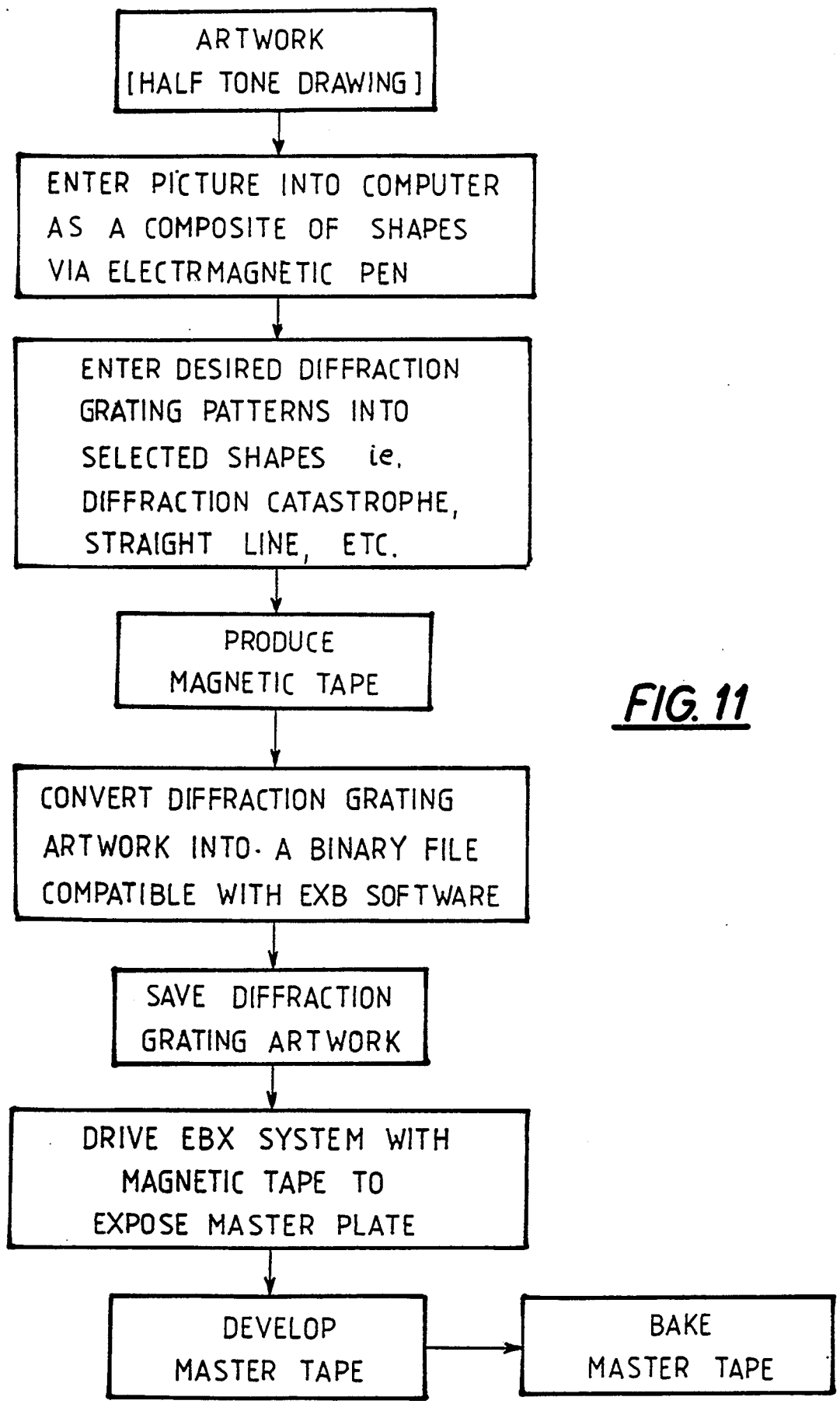
Figure 12A:
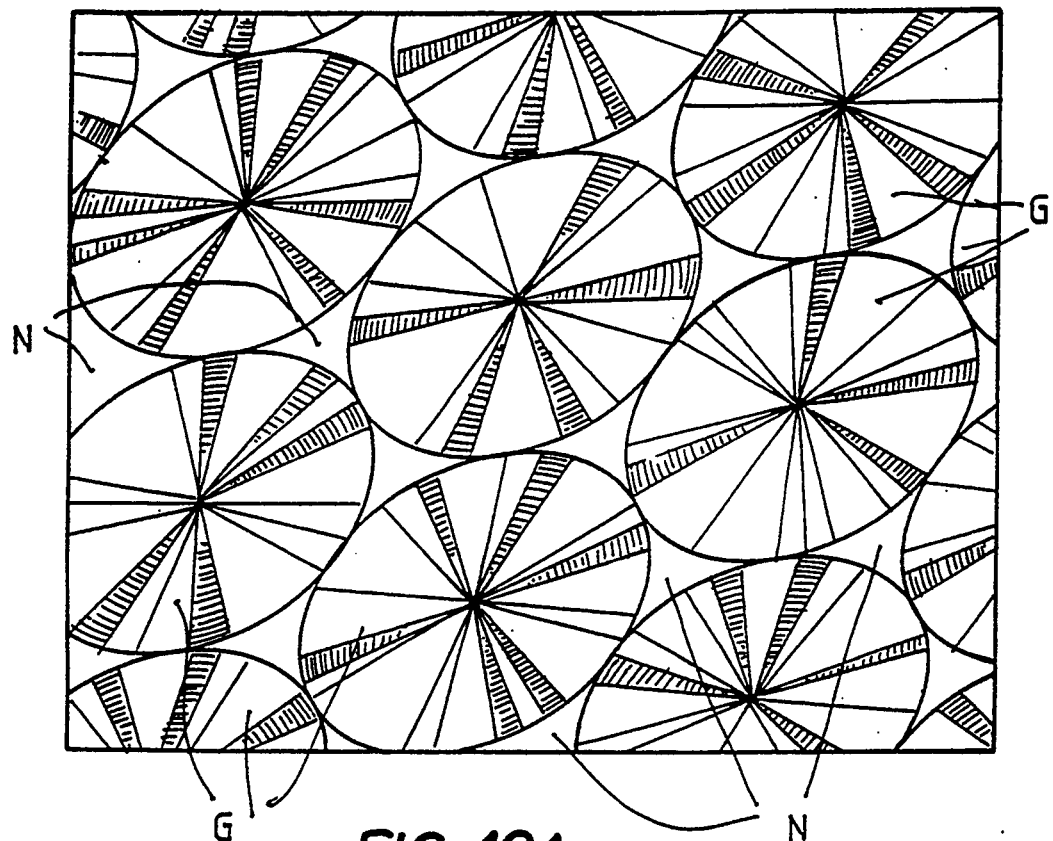
Figure 12B:
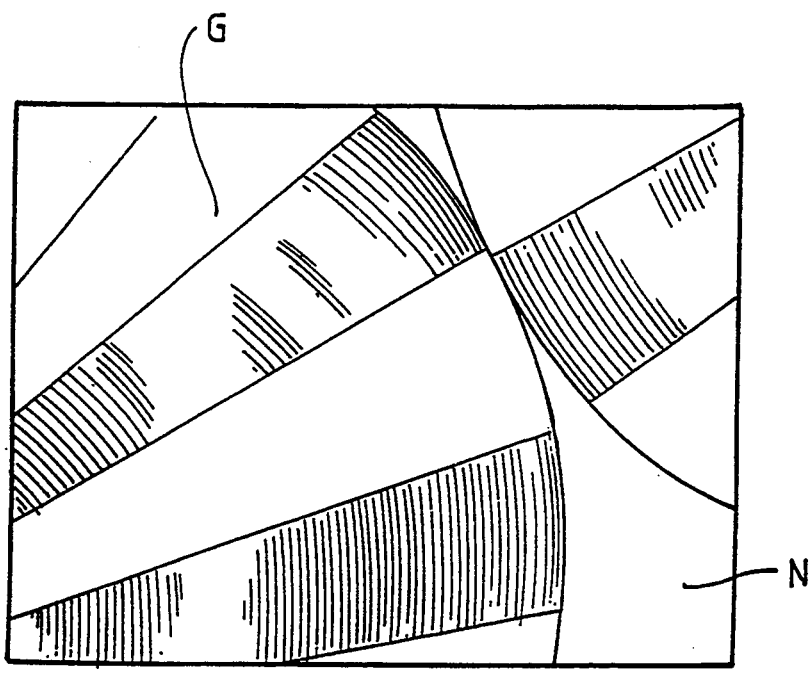

FIGS. 4A-B, 5A-B, 6A-B and 7A-B compare the fluorescent tube image diffraction patterns for the gratings of FIGS. 2 and 3, at different observation positions, the right print in each case being the pattern for the grating of FIG. 2;

FIG. 8 is a computer predicted plot of a catastrophe Fresnel diffraction pattern for a typical pixel of the grating shown in FIG. 3;

FIG. 9 is the computed first order Fresnel diffraction pattern for the grating of FIG. 2;

FIG. 10 is the corresponding Fresnel diffraction pattern for the grating of FIG. 3;

FIG. 11 is a schematic diagram showing the general features of the manufacturing process applicable to the above embodiment and the embodiment of FIG. 12;

FIG. 12A is an enlarged (×28) graphic representation of diffraction grating according to another aspect of the invention, and FIG. 12B is a further enlarged (×40) representation of portion of the grating of FIG. 12A showing the grating and grating free areas in more detail.

Before proceeding to describe a specific example of a diffraction grating in accordance with the first aspect of the invention, the manner in which the inventive grating achieves the aforementioned objective will now be discussed.

The dominant effect of the function C(x,y) is to break the given portrait function P(x,y) up into a collection of optically varying multicoloured small picture elements or pixels in an analogous fashion to the way conventional screen printing technology converts a static continuous tone colour image into a collection of multicoloured dots.

In more precise language, the effect of the catastrophe lattice is to frequency modulate the Fourier spectrum of the picture function in such a way as to induce amplitude modulation of the image diffraction pattern of the picture function. When a grating according to the invention is observed directly under an extended source such as a fluorescent tube this amplitude modulation is manifested by the intensities of the pixels varying smoothly with changing angle of view. The rate of variation of the intensity of a given pixel is directly proportional to the size of the diffraction catastrophe associated with that pixel. In this sense the pixels may be said to possess a degree of structural stability because any perturbation of the initial wavefront due to crinkling of the grating surface in the vicinity of the pixel will only cause a change of intensity in the pixel. This is in contrast to conventional generalized gratings or image holograms where the local line pattern in areas equivalent to the size of a pixel is rectilinear and therefore any local crinkling perturbation will cause the observed image point to "switch off" completely. Conventional generalized gratings or image holograms are therefore highly structural unstable since for a given wavelength small areas of the grating diffract narrow pencil-like beams which are much more sensitive to perturbations than the expanding beams produced by the pixels of a grating.

Figure 1A:
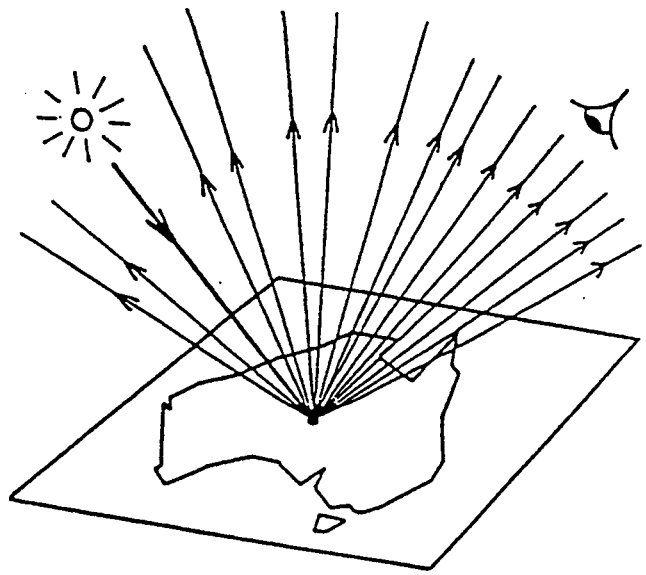
Figure 1B:
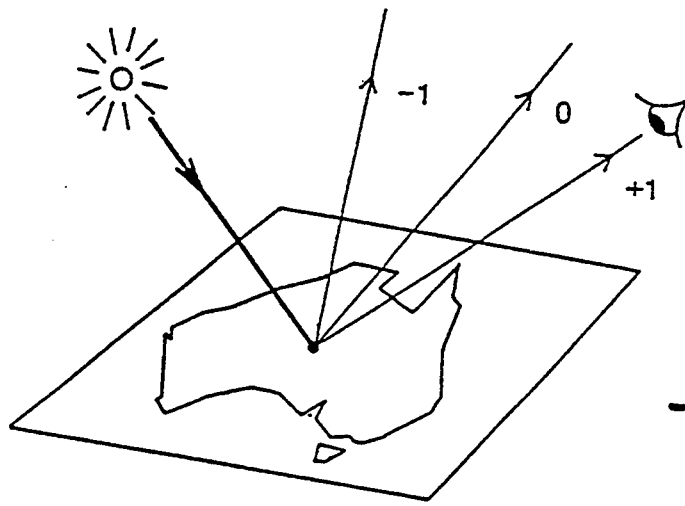
Figure 1C:
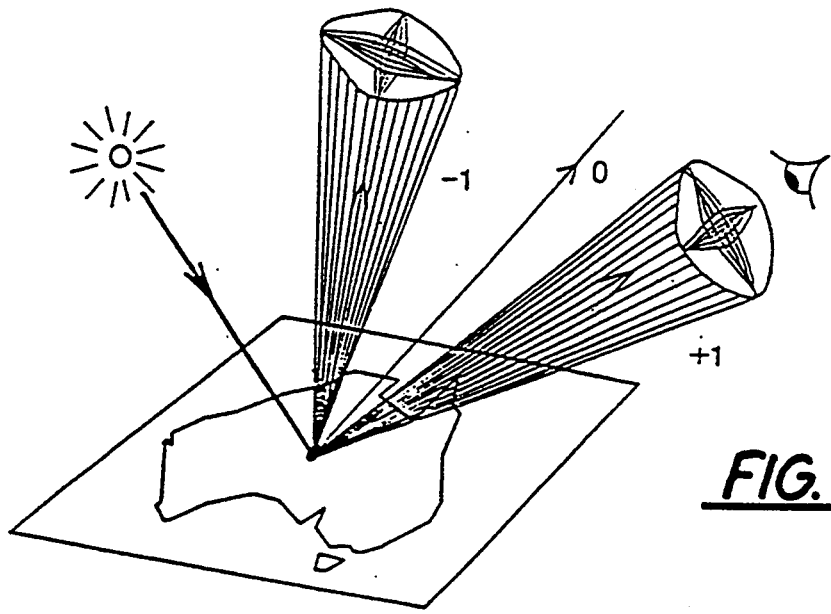
Figure 4A:
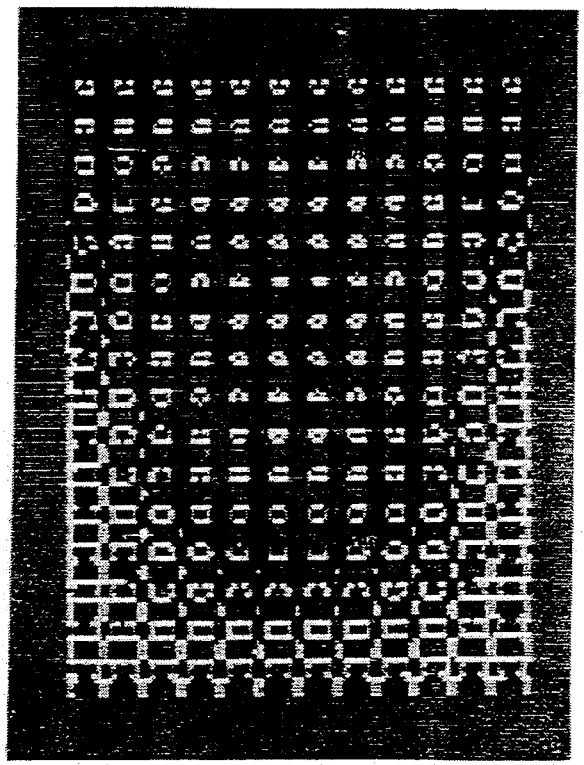
Figure 4B:
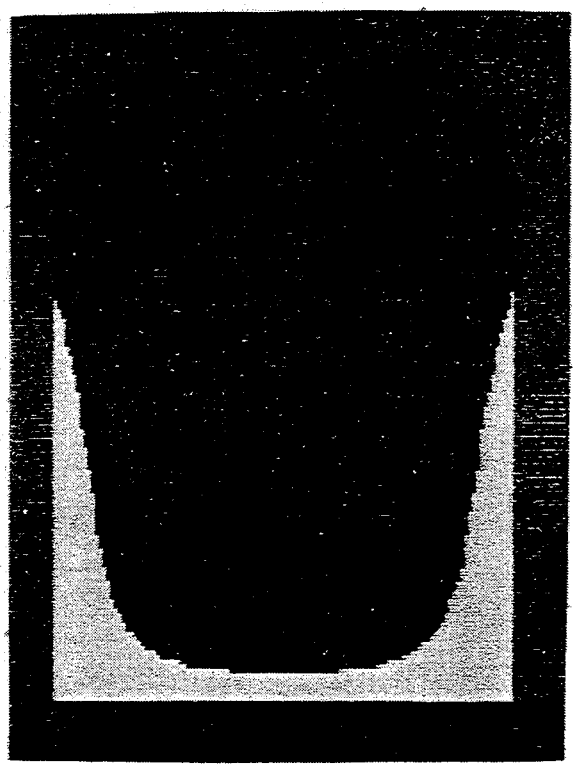
Figure 5A:
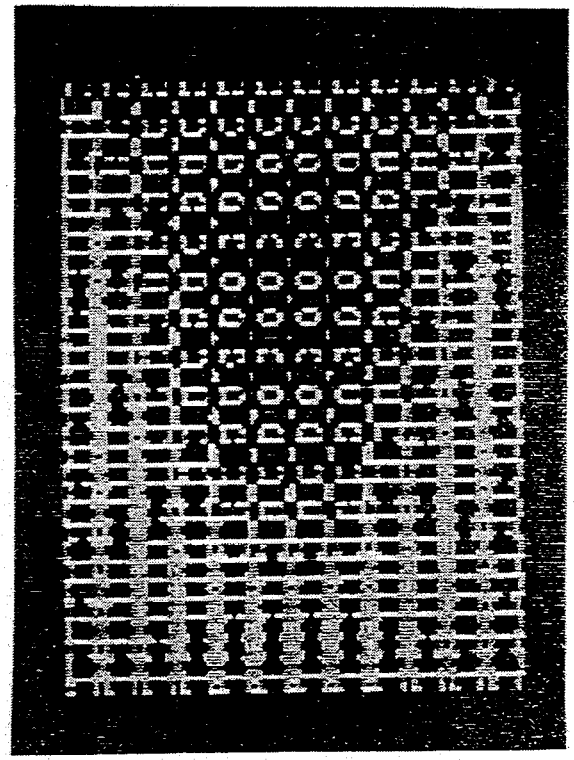
Figure 5B:
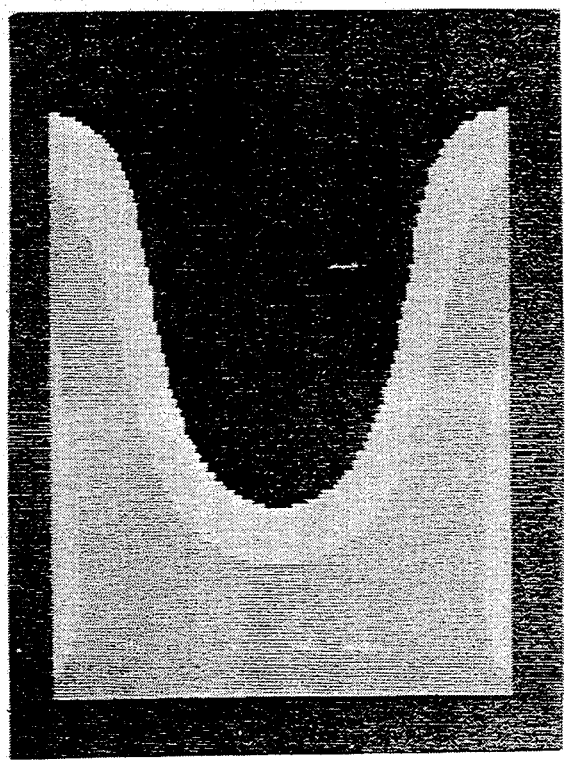
Figure 6A:
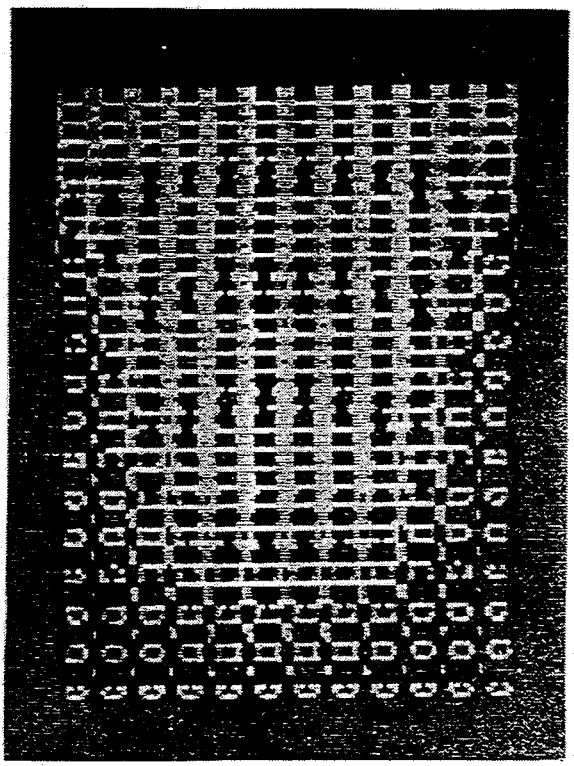
Figure 6B:
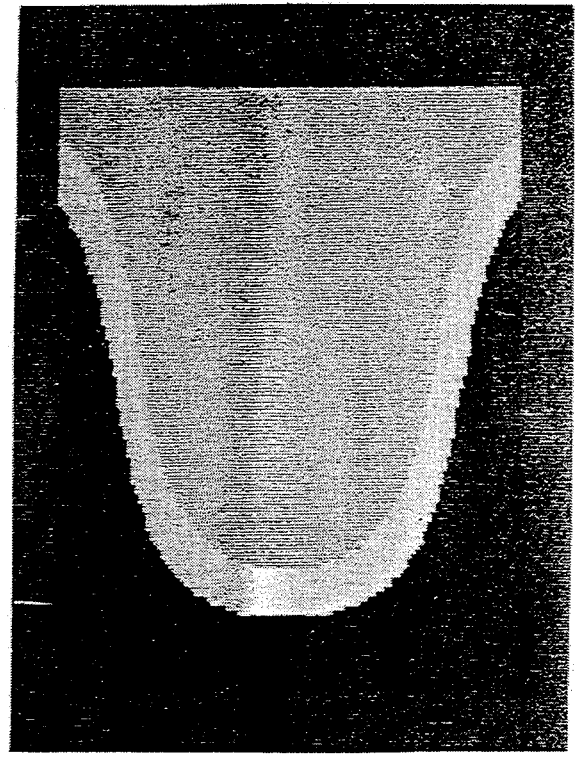
Figure 7A:
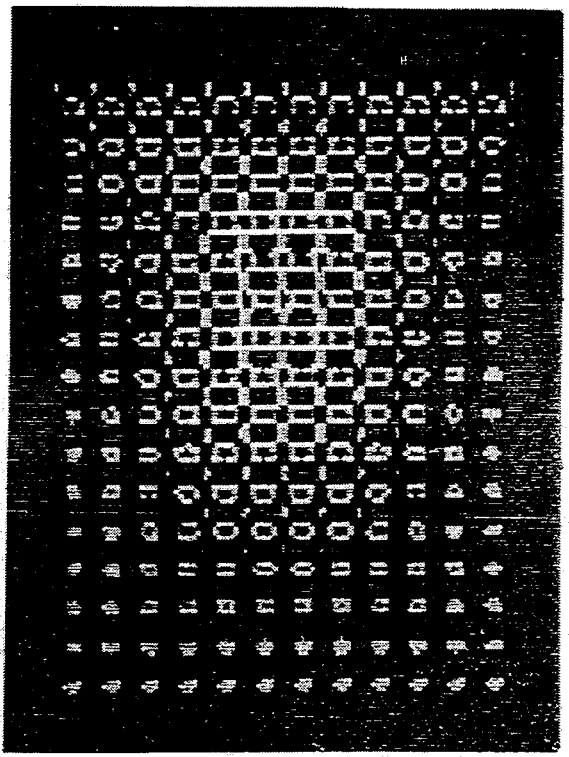
Figure 7B:
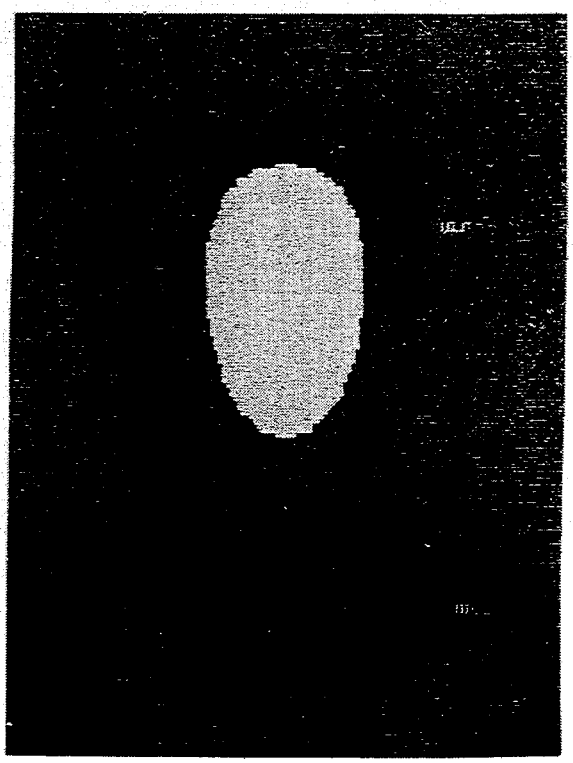

The above ideas are illustrated schematically in FIGS. 1A, 1B and 1C. FIG. 1A shows why a conventional screen printed portrait is not optically variable. An incident light beam striking a typical printed pixel is scattered in all angular directions. The optical image is therefore static (perfectly structurally stable) and observable at any angle of view under any polychromatic light source. To make this printed portrait optically variable the pixels must be made to scatter incoming light specularly into a much narrower range of scattering angles in order for the eye of the observer to see particular pixels only at certain angles of observation. One known way of doing this is to convert each small area or pixel into a miniature straight line diffraction grating. FIG. 1B with a characteristic groove frequency for each pixel so that at one particular angle of observation the colour map of the total grating corresponds with the colour map of the required image. The problem with this type of grating device is that because the pixels diffract the incoming light into narrow beams any slight perturbation or aberration in the observation conditions, such as a slight crinkling of the grating surface, will cause the diffracted light from the affected pixels to miss the eye of the observer and thereby cause rapid degradation of the expected image. This type of grating may therefore be said to be highly structurally unstable since the diffracted image is far too sensitive to perturbations in the observation conditions. A solution to this problem is the concept behind the invention and is explained schematically, for the example at hand, in FIG. 1C. The basic idea is to replace the unstable straight line grating of FIG. 1B by a pixellated line pattern which diffracts incoming light into structurally stable expanding beams of light. These expanding beams or diffraction catastrophes ensure that the pixels will still be observable after crinkling of the grating surface as long as the crinkling angles do not exceed the angular range of the boundary caustics of the pixel diffraction catastrophes. The observed image of a grating according to the invention is therefore structurally stable within the boundary caustics and optically variable outside.

Because gratings according to the invention are much less sensitive to crinkling perturbations than conventional gratings or image holograms they are much better suited to applications involving flexible surfaces—in particular as highly secure optically variable labels for currency notes.

An exemplary subclass of diffraction gratings in accordance with the invention is determined by the following special forms of the functions set forth above:

$$W(x,y) = y \qquad (3)$$
$$P(x,y) = \alpha[\cos(\pi x/2)\sin(\pi y/2) - (2/3)\cos(\pi x/2) - (2/3)\sin(\pi y/2)]$$
$$F(x,y) = 0$$
$$C(x,y) = \beta[\cos(Q\pi x)\cos(Q\pi y) - (2/3)\cos(Q\pi x) - (2/3)\cos(Q\pi y)]$$

A particular embodiment of this subclass of grating has been generated on a computer graphic system and then manufactured by means of electron beam lithography modified for oblique line writing operations. In this embodiment, the variables $\alpha$, $\beta$ and $Q$ in the above functions are given by:

$$\alpha = 0.30, \beta = 0.666, \text{ and } Q = 16.0 \qquad (4)$$

It will be observed that the carrier function $W(x,y)$ and the picture function $P(x,y)$ are relatively slowly varying functions of x and y while the periodic lattice catastrophe function C(x,y) is a realtively rapidly varying function of x and y. As already noted, it is this rapidly varying nature of the function C(x,y) that induces amplitude modulation and structural stability in the picture function P(x,y) but a consequence is that very large data files and large amounts of computer time are required to accurately specify the grating function S(x,y).

The explicit form of the grating function for this embodiment, obtained by iterating the above expression with S(x,y)=z, where z is the groove index number, is given by:

$$Y_1 = z - \alpha[\cos(\pi x/2)\sin(\pi z/2) - (2/3)\cos(\pi x/2) - (2/3)\sin(\pi z/2)] - \beta[\cos(Q\pi x)\cos(Q\pi z) - (2/3)\cos(Q\pi x) - (2/3)\cos(Q\pi z)]$$

$$Y_2 = z - \alpha[\cos(\pi x/2)\sin(\pi y_1/2) - (2/3)\cos(\pi x/2) - (2/3)\sin(\pi y_1/2)] - \beta[\cos(Q\pi x)\cos(Q\pi y_1) - (2/3)\cos(Q\pi x) - (2/3)\cos(Q\pi y_1)]$$

$$Y_3 = z - \alpha[\cos(\pi x/2)\sin(\pi y_2/2) - (2/3)\cos(\pi x/2) - (2/3)\sin(\pi y_2/2)] - \beta[\cos(Q\pi x)\cos(Q\pi y_2) - (2/3)\cos(Q\pi x) - (2/3)\cos(Q\pi y_2)]$$

$$Y_4 = z - \alpha[\cos(\pi x/2)\sin(\pi y_3/2) - (2/3)\cos(\pi x/2) - (2/3)\sin(\pi y_3/2)] - \beta[\cos(Q\pi x)\cos(Q\pi y_3) - (2/3)\cos(Q\pi x) - (2/3)\cos(Q\pi y_3)]$$

$$y = z - \alpha[\cos(\pi x/2)\sin(\pi y_4/2) - (2/3)\cos(\pi x/2) - (2/3)\sin(\pi y_4/2)] - \beta[\cos(Q\pi x)\cos(Q\pi y_4) - (2/3)\cos(Q\pi x) - (2/3)\cos(Q\pi y_4)]$$

where $\alpha = 0.30$, $\beta = 0.006$ and $Q = 16.0$

The x—axis ranges between $-0.75$ and $+0.75$ in steps of $1/(600)$ while the y—axis ranges between $-1.0$ and $+1.0$ in steps of $1/(7500)$. The physical dimensions of the grating are 18.75 mm in the x direction by 25 mm in the y direction. The average line density of the grating is therefore 600 lines/min. Each pixel is a 0.78 mm square, giving a total of 768 pixels. In plotting the grating an initial z value of $-1.4$ was chosen and incremented in steps of $1/(7500)$. The computer program included conditional statements which rejected all y values less than $-1.0$ and greater than $+1.0$.

FIG. 3 is a computer plot of the grating of the embodiment, that is according to equations (1), (2) and (3) and parameter values (4). For purposes of comparison, FIG. 2 is a computer plot of the corresponding conventional line grating, that is one in which S(x,y)+KN and S(x,y) is given by W(x,y)+P(x,y): no function C(x,y) is included.

It is possible to calculate and illustrate by computer graphics the image diffraction patterns of gratings in accordance with the invention, utilizing the aforementioned theory of generalized diffraction gratings. The results for the embodiment of interest are depicted in FIGS. 4A-B, 5A-B, 6A-B and 7A-B which show how the patterns vary with angular view and in each case show at the right the image diffraction pattern for the conventional line grating of FIG. 2 and at the left the corresponding pattern at the same position of observation for the inventive pattern of FIG. 3.

All calculations were performed on a computer graphics system programmed with the main equations of the aforementioned theory of generalized diffraction gratings. By comparing corresponding pairs of diffraction patterns in FIGS. 4A-B, 5A-B, 6A-B and 7A-B, it can be seen how the pixels of the inventive grating slowly switch on and off in accordance with the form of the picture function. In other words the picture function acts as a control when to start switching on or off at the edges of the colours. The rate at which the pixels switch on or off is controlled by the size of the corresponding Fourier space caustics. The larger the caustic, i.e. the larger the value of the parameter $\beta$, the slower the pixel switches on or off and vice-versa. This is what is meant by diffraction catastrophe frequency modulation in Fourier space producing amplitude modulation in real space.

A computer plot of a diffraction catastrophe for a typical $0.78 \times 0.78$ mm pixel of the grating of FIG. 3 is shown in FIG. 8. FIG. 9 shows a computed first order Fresnel diffraction pattern of the picture function grating while FIG. 10 shows the corresponding diffraction pattern of the grating of FIG. 3. This last figure shows clearly how the pixel diffraction catastrophes modulate the Fourier spectrum of the picture function. Because the angular range of each small area of the grating is now much increased the pixels are now less sensitive to crinkling perturbations which change the directions of scatter of the diffracted beams.

FIGS. 8, 9 and 10 also imply an important consequence for the practical application of gratings according to the invention. Because the pixels diffract the light over a much greater range of solid angles than a conventional grating the observed energy density reaching the retina of the eye at a particular angle of view is much less than in the case of the conventional grating. This means that the requirements on diffraction efficiencies are more significant for a grating according to the invention than for any other type of grating. In particular, if the grating lines are grooves, the groove depths should be optimized for maximum diffraction efficiency. For a square wave groove profile this generally means that the groove depth should be about 40 percent of the average groove spacing. In the case of the grating of FIG. 3, the groove depth should be about 0.6 micron.

As mentioned, actual gratings in the form of FIG. 3 was constructed by programming an electron beam lithography system modified for oblique line writing operations. The grating was written on PGMA electron resist spin coated onto a chrome coated glass substrate, and then processed to produce a gold coated nickel master from which plastic film replica gratings were pressed.

The initial thickness of the unexposed resist was 0.6 micron while the chrome thickness was 0.1 micron. After exposure and development and post-baking the groove depths were determined by interference microscopy to be 0.2 micron. The grating is then ion beam etched to remove the chrome except in areas covered by resist and washed to remove the residual resist. The chrome mask grating pattern is then used for contact printing the groove pattern onto a photoresist coated glass plate to obtain the required depth of 0.6micron, Alternatively the required groove depth may be obtained by reactive sputter etching a quartz plate chrome masked by the required grating line pattern. A durable metal master of this optimized grating is then obtained by vacuum coating the photoresist master with 200 Angstroms of 99.99% gold and electro-depositing a thick layer of nickel to act as a support.

After separating from the glass master this gold coated nickel master is bonded to a brass block and used as a die for hot pressing of plastic film replica gratings. In order for the plastic replicas to retain the optimized diffraction efficiencies of the master die the temperature and pressure combinations associated with the hot embossing process should be such that the replicated groove depths should be as close as possible to the original 0.6 micron groove depth of the metal die.

After metallizing with aluminium and plastic coated for protection, the plastic replicas may be adhesively attached to currency notes or credit cards.

Tests carried out on the prototype grating confirmed all the theoretical predictions relating to the concept of the invention. The grating, and a further grating constructed according to FIG. 2, were observed in the normal direction at a distance of 30 centimeters with a fluorescent tube positioned parallel to the short side of the grating at an angle of 30 degrees to the normal to the grating. In the case of the grating according to the invention the colour change from orange to blue is much more gradual, being described in terms of the reducing size of the red-yellow pixels, than in the case of the conventional grating. This change takes place by means of a collapsing centre mechanism whereby the blue grid with its red dots collapses into the centre of the grating while a greed grid contained red and blue dots moves in from the edge of the grating. This green grid then col lapses into the centre while the final red grid with its blue dots moves in from the boundary. It is thus appreciated that the grating according to the invention preserves the optical variability with position of view but nevertheless exhibits a good degree of structural stablility in the sense that the observed intensity of diffracted light from a particular point on the grating surface changes smoothly when the grating surface is crinkled in the vicinity of the observed point.

The diffraction grating of FIG. 3 possesses other advantages sought in the choice of the respective functions and in the values of the variable parameters. There is minimal chromatic degradation with respect to wear and scrunch induced diffuse scatter. Each 0.78 mm×0.78 mm square pixel generates its own structurally stable focussed beam: the ability of this focussed beam to penetrate a fog of diffuse matter is determined by the caustic structure of the beam. The grating also possesses a high degree of observing power. The observing power if a generalized grating is defined as the proportion of the grating surface observed to light up at any given angle of view. Ideally, one would like to be able to see fairly uniformly distributed diffracted light over a large range of viewing angles. The square lattice structure of 768 pixels achieves this requirement: as the viewing angle is changed by rocking the grating under a fluorescent tube parallel to the rocking axis, which parallel in turn to the short side of the grating, the pixels switch on and off and change colour in such a manner that the distribution of off and on pixels is even across the grating.

It will be appreciated that the complexity of the line pattern and associated diffraction images exemplified by FIGS. 3 and 4–7 means that gratings in accordance with the invention are much more difficult to stimulate or copy holographically than convention gratings or image holograms. Fabrication of master gratings in accordance with the invention is presently only possible on an especially modified electron beam lithography system.

The described achievement of amplitude modulation of a given picture function in real space by diffraction catastrophe frequency modulation in Fourier space not only gives the desired structural stability to the picture function but also has the effect of inducing subtle colour tone effects into the picture function in a manner analogous to the way in which conventional colour printing technolgoy generates colour images in terms of a matrix of coloured dots. This ability of the inventive gratings to generate optically variable colour tone effects has obvious artistic advantages over holograms for credit card applications.

A more sophisticated form of the invention will now be generally described with reference to the schematic representations of the apparatus in FIG. 11. The apparatus required to achieve the described process will be well-known to persons skilled in the art and is not therefore described in greater detail in this specification. Reference may be had to various texts on this subject, including Chapter 20 of "Practical Display Holography".

The steps involved in the diffraction grating preparing process are generally as follows.

First a desired portrait is scanned by a digitizing camera with a built in photomultiplier to record brightness levels in each part of the picture. The resulting data is stored in the memory of a computer graphics system and processed by a special purpose interactive software package incorporating the theory of generalized diffraction gratings referred to above. What this software does is to provide the grating designer with a set of options for converting the portrait data into a grating line pattern embodying the invention and corresponding data file for electron beam fabrication of the grating.

The first part of the program "screens" the digitized portrait, in much the same way that conventional colour printing technology converts a continuous tone image into a matrix of coloured spots of pixels of varying sizes. The resolution of the screen is the choice of the designer and obviously the smaller the pixels the larger the resultant data file. The second part of the program converts each pixel of the screened portrait into a miniature diffraction grating. The rulings of each pixel grating are curved in such a way as to generate bounded expanding beams of light when alluminated by a collimated source. These bounded expanding beams or diffraction catastrophes are described by the above mathematical functions which include several free floating parameters. These parameters enable the grating designer to fix the brightness and stablility of each pixel, choose the colour and orientation of each pixel, fix the distance and angle at which the diffracted image has maximum clarity and finally to choose the light sources that give maximum effect to the portrait image. Since a typical high resolution grating would be expected to encompass something like ten thousand pixels the control device for "filling in" the pixels with the required parameter values would need to take the form of a light pen or graphics tablet. In order for the resulting grating to be strongly resistant to counterfeiting by reflection contact printing the class of diffraction catastrophes included in the design program would be restricted to those that generated strong moire effects when contact printed.

The final part of the design program consists of a set of subroutines for displaying the observed diffraction patterns of the grating under a range of commonly available light sources and observing conditions. If an initial design is not satisfactory in some respect the designer could then go back and modify the design before producing the data file for EBX fabrication.

In another form of the invention, which is shown schematically in FIG. 12, comprises a series of diffraction grating areas G are separated by non-grating areas N to provide a greater degree of contrast in the diffraction pattern thereby resulting in a perceivably brighter diffraction pattern. The grating areas G may be defined by straight line gratings or by gratings according to the embodiment of the invention described above. If desired, at least some of the grating areas G may be arranged at different angles to change the viewing angle at which the grating 'switches on' and 'switches off'. The grating areas G should be no smaller than the resolution of the human eye and the grating free areas should not exceed about 20 to 50% of the total area of the grating, and optimally about 30% of the total area. The gratings according to this embodiment are made by the method described in connection with FIG. 11, with the exception that the grating areas may be in the form of standard straight line gratins or any other form of grating if desired.

What is claimed is:

1. A diffraction grating of reflective or transmissive lines formed by a regular matrix of pixels each containing at least a respective curvilinear portion of one or more of said lines, which pixels when illuminated each generate a two-dimensional optical catastrophe image diffraction pattern whereby the total image diffraction pattern of the grating is optically variable but structurally stable.

2. The grating of claim 1, wherein said reflective/transmissive lines of the grating are advantageously such that they are defined, in terms of coordinates x,y in the plane of the grating, by the equation $S(x,y)=kN$ where k is a scaling factor, N is an integer and the function $S(x,y)$ is given by:

$$S(x,y)=W(x,y)+P(x,y)+C(x,y) \quad (1)$$

where $S(x,y)$ is the initial phase function generated by the grating when illuminated normally by a collimated monochromatic light wave, $W(x,y)$ is a carrier wave of non-zero order, $P(x,y)$ is a picture or portrait function which determines the broad shape of the image diffraction pattern, and is piecewise relatively slowly varying with respect to x and y, and $C(x,y)$ is a periodic lattice function of x, y which varies relatively rapidly with respect to x and y and whose Hessian is not identically zero except along certain characteristic lines corresponding to the caustics in the Fresnel or Fraunhofer diffraction pattern of the grating.

3. The grating of claim 2, wherein the Hessian of $C(x,y)$ is:

$$[\partial^2 C(x,y)/\partial x^2]\cdot[\partial^2 C(x,y)/\partial y^2]-[\partial^2 C(x,y)/\partial x \partial y]^2 \quad (2)$$

with the proviso that the Hessian be not identically zero except along predetermined characteristic lines.

4. The grating of claim 2 or 3, wherein the right side of the equation for the function $S(x,y)$ includes a focussing term of the form $F(x,y)=b_1 x^2+b_2 y^2$ where $b_1$ and $b_2$ are constants chosen to focus the diffracted waves at the required distance from the grating.

5. The grating of claim 1, wherein said pixels are less than 1 mm$^2$ in area.

6. The grating of claim 5, wherein said pixels are between 0.25 and 0.75 mm$^2$ in area.

7. The grating of claim 5, wherein said reflective lines and grooves selected from square cut grooves and sinusoidal cut grooves or a combination of square and sinusoidal cut grooves.

8. A security device having improved contrast properties comprising a diffraction grating of reflective or transmissive lines, comprising a multiplicity of diffraction grating regions, which are at least partly separated by a multiplicity of grating free regions, each grating free region having a dimension which is at least large enough to be resolved by the human eye, the grating free regions not exceeding about 20 to 50% of the total area of the grating.

9. The device of claim 8, wherein said diffraction grating comprises a regular matrix of pixels each defining a said diffraction grating region which, when illuminated, each generate a two-dimensional optical catastrophe image diffraction pattern whereby the total image diffraction pattern of the grating is optically variable but structurally stable.

10. The grating of claim 8 or 9, wherein each grating region and each grating free region is no smaller than the resolution of the human eye, said grating free regions not exceeding about 20 to 50% of the total area of the grating.

11. The device of claim 8 or 9, wherein said grating free regions do not exceed about 30% of the total area of the grating.

12. The device of claim 8 or 9, wherein the diffraction grating within each pixel or within said grating region is selected to generate strong moire effects when contact printed.

13. The security device of claim 9, wherein said reflective/transmissive lines of the grating are advantageously such that they are defined, in terms of coordinates x,y in the plane of the grating, by the equation $S(x,y)=kN$ where k is a scaling factor, N is an integer and the function $S(x,y)$ is given by:

$$S(x,y)=W(x,y)+P(x,y)+C(x,y) \quad (1)$$

where $S(x,y)$ is the initial phase function generated by the grating when illuminated normally by a collimated monochromatic light wave, $W(x,y)$ is a carrier wave of non-zero order, $P(x,y)$ is a picture or portrait function which determines the broad shape of the image diffraction pattern, and is piecewise relatively slowly varying with respect to x and y, and $C(x,y)$ is a periodic lattice function of x,y which varies relatively rapidly with respect to x and y and whose Hessian is not identically zero except along certain characteristic lines corresponding to the caustics in the Fresnel or Fraunhofer diffraction pattern of the grating.

14. The security device of claim 13, wherein the Hessian of $C(x,y)$ is:

$$[\partial^2 C(x,y)/\partial x^2] \cdot [\partial^2 C(x,y)/\partial y^2] - [\partial^2 C(x,y,)/\partial x \partial y]^2 \qquad (2)$$

with the proviso that the Hessian be not identically zero except along predetermined characteristic lines.

15. The security device of claim 13 or 14, wherein the right side of the equation for the function S(x,y) includes a focussing term of the form $F(x,y) = b_1 x^2 + b_2 y^2$ wherein $b_1$ and $b_2$ are constants chosen to focus the diffracted waves at the required distance from the grating.

16. The security device of claim 9 or 13, wherein said pixels are less than 1 mm$^2$ in area.

17. The security device of claim 16, wherein said pixels are between 0.25 and 0.75 mm$^2$ in area.

18. A security device comprising a plastic film grating configured to form part of a currency note or credit card, wherein said grating is a pixellated diffraction grating in which each pixel is an individual diffraction grating of reflecting or transmissive lines, said security device, when illuminated, generating an image that is optically variable with position of view and that retains its structural stability in that the observed intensity of diffracted light from a particular point on the grating surface changes smoothly when the grating surface is crinkled in the vicinity of the observed point.

19. The device of claim 18, wherein each individual diffraction grating is constructed to induce color tone effects in said image that are optically variable with position of view.

20. The device of claim 18, wherein said pixels are less than 1 mm$^2$ in area.

21. The device of claim 20, wherein said pixels are between 0.25 and 0.75 mm$^2$ in area.

22. The device of claim 18, wherein one or more of the individual diffraction gratings are constructed to produce strong moire effects when contact printed.

23. A security device comprising a plastic film grating configured to form part of a currency note or credit card, wherein said grating is a pixellated diffraction grating in which each pixel is an individual diffraction grating of reflecting or transmissive lines, said security device, when illuminated, generating an optically variable but structurally stable image, wherein each individual diffraction grating generates a two-dimensional optical catastrophe image diffraction pattern when illuminated.

24. The device of claim 23, wherein said diffraction grating is constructed to induce color tone effects in said image that are optically variable with position of view.

25. The device of claim 23, wherein said reflective/transmissive lines of the grating are advantageously such that they are defined, in terms of coordinates x,y in the plane of the grating, by the equation $S(x,y) = kN$ where k is a scaling factor, N is an integer and the function S(x,y) is given by:

$$S(x,y) = W(x,y) + P(x,y) + C(x,y) \qquad (1)$$

where S(x,y) is the initial phase function generated by the grating when illuminated normally by a collimated monochromatic light wave, W(x,y) is a carrier wave of non-zero order, P(x,y) is a picture or portrait function which determines the broad shape of the image diffraction pattern, and is piecewise relatively slowly varying with respect to x and y, and C(x,y) is a periodic lattice function of x,y which varies relatively rapidly with respect to x and y and whose Hessian is not identically zero except along certain characteristic lines corresponding to the caustics in the Fresnel or Fraunhofer diffraction pattern of the grating.

26. The device of claim 25, wherein the Hessian of C(x,y) is:

$$[\partial^2 C(x,y)/\partial x^2] \cdot [\partial^2 C(x,y)/\partial y^2] - [\partial^2 C(x,y,)/\partial x \partial y]^2 \qquad (2)$$

with the proviso that the Hessian be not identically zero except along predetermined characteristic lines.

27. The device of claim 25, wherein the right side of the equation for the function S(x,y) includes a focussing term of the form $F(x,y) = b_1 x^2 + b_2 y^2$ wherein $b_1$ and $b_2$ are constants chosen to focus the diffracted waves at the required distance from the grating.

28. The device of claim 18 or 23, wherein the plastic film grating is metallized and has an outer protective plastic coating.

29. A currency note having the device of claim 18 or 23 attached thereto.

30. A credit card having the device of claim 18 or 23 attached thereto.

31. A method of providing an item susceptible to counterfeiting with a diffraction grating, comprising
   scanning an optically invariable image to form a matrix of pixellated portions of said image, then
   producing from said pixellated portions a pixellated diffraction grating in which each pixel is an individual diffraction grating of reflective or transmissive lines each including a said pixellated portion of said image, said diffraction grating, when illuminated, generating an optically variable but structurally stable image; and then
   attaching said grating to the item.

32. The method of claim 31, wherein each individual diffraction grating is less than 1 mm$^2$ in area.

33. The method of claim 32, wherein said area is between 0.25 and 0.75 mm$^2$.

34. A method of providing an item susceptible to counterfeiting with a diffraction grating, comprising scanning an optically invariable image to form a matrix of pixellated portions of said image, then producing from said pixellated portions a pixellated diffraction grating in which each pixel is an individual diffraction grating of reflective or transmissive lines each including a said pixellated portion of said image, said diffraction grating, when illuminated, generating an optically variable but structurally stable image, and attaching said grating to the item, the method further comprising selecting parameters for each individual diffraction grating from one or more of brightness, stability, color, orientation, distance and angle at which the optically variable image has maximum clarity and the light source giving maximum effect to the optically variable image.

35. The method of claim 31 or 34, further comprising constructing one or more of said individual diffraction gratings in a manner which produces strong moire effects when contact printed.

36. The method of claim 31 or 34, wherein said step of producing said grating further comprises producing a master die and then producing a plastic film replica grating from the master die, then metallizing the plastic film replica grating, and then coating the metallized plastic film with a protective plastic coating.

37. A method of forming a diffraction grating, comprising scanning an optically invariable image to form a matrix of pixellated portions of said image, producing from said pixellated portions a pixellated diffraction grating in which each pixel is an individual diffraction grating of reflective or transmissive lines each including a said pixellated portion of said image, said diffraction grating, when illuminated, generating an optically variable but structurally stable image, the method further comprising forming said reflecting or transmissive lines in a manner which generates, when the diffraction grating is illuminated, a two-dimensional optical catastrophe image diffraction pattern.

38. The method of claim 37, comprising forming said reflecting/transmissive lines of each individual grating in terms of coordinates x,y in the plane of the grating, by the equation $S(x,y)=kN$ where k is a scaling factor, N is an integer and the function $S(x,y)$ is given by:

$$S(x,y) = W(x,y) + P(x,y) + C(x,y) \quad (1)$$

where $S(x,y)$ is the initial phase function generated by the grating when illuminated normally by a collimated monochromatic light wave, $W(x,y)$ is a carrier wave or non-zero order, $P(x,y)$ is a picture or portrait function which determines the broad shape of the image diffraction pattern, and is piecewise relatively slowly varying with respect to x and y, and $C(x,y)$ is a periodic lattice function of x,y which varies relatively rapidly with respect to x and y and whose Hessian is not identically zero except along certain characteristic lines corresponding to the caustics in the Fresnel or Fraunhofer diffraction pattern of the grating.

39. The method of claim 38, further comprising forming said reflective/transmissive lines in a manner such that the Hessian of $C(x,y)$ is:

$$[\partial^2 C(x,y)/\partial x^2] \cdot [\partial^2 C(x,y)/\partial y^2] - [\partial^2 C(x,y)/\partial x \partial y]^2 \quad (2)$$

with the proviso that the Hessian be not identically zero except along predetermined characteristic lines.

40. The method of claim 39, further comprising forming the reflective/transmissive lines such that the right side of the equation for the function $S(x,y)$ includes a focussing term of the form $F(x,y)=b_1 x^2 + b_2 y^2$ wherein $b_1$ and $b_2$ are constants chosen to focus the diffracted waves at the required distance from the grating.

41. A method of providing an item susceptible to counterfeiting with a diffraction grating, comprising scanning an optically invariable image to form a matrix of pixellated portions of said image, then producing from said pixellated portions a pixellated diffraction grating in which each pixel is an individual diffraction grating of reflective or transmissive lines each including a said pixellated portion of said image, said diffraction grating, when illuminated, generating an optically variable but structurally stable image, and attaching said grating to the item, the method further comprising forming each individual diffraction grating so that they are at least partly separated from each other by a multiplicity of grating free regions, each grating free region having a dimension which is at least large enough to be resolved by the human eye, the grating free regions not exceeding about 20% to 50% of the total area of the grating.

42. The method of claim 41, wherein said grating free regions do not exceed about 30% of the total area of the grating.

* * * * *

UNITED STATES PATENT AND TRADEMARK OFFICE
CERTIFICATE OF CORRECTION

PATENT NO. : 5,335,113
DATED : August 2, 1994
INVENTOR(S) : Jackson et al.

It is certified that error appears in the above-indentified patent and that said Letters Patent is hereby corrected as shown below:

On the title page, item [75] Inventors: delete the word "both" in the listing of the inventors and insert ---Robert A. Lee, all--- after "Goodman,".

Signed and Sealed this

Second Day of July, 1996

*Attest:*

BRUCE LEHMAN

*Attesting Officer*   *Commissioner of Patents and Trademarks*